United States Patent
Kunimoto

(10) Patent No.: US 11,360,727 B2
(45) Date of Patent: Jun. 14, 2022

(54) NON-TRANSITORY COMPUTER-READABLE MEDIUM, TERMINAL MANAGEMENT APPARATUS AND TERMINAL MANAGEMENT SYSTEM CONFIGURED TO TRANSMIT A RECEIVED INSTRUCTION TO A RELAY APPARATUS WITHOUT BEING DIVIDED

(71) Applicant: BROTHER KOGYO KABUSHIKI KAISHA, Nagoya (JP)

(72) Inventor: Shintaro Kunimoto, Kiyosu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/143,789

(22) Filed: Jan. 7, 2021

(65) Prior Publication Data

US 2021/0208830 A1 Jul. 8, 2021

(30) Foreign Application Priority Data

Jan. 8, 2020 (JP) .............................. JP2020-001474

(51) Int. Cl.
*G06F 3/12* (2006.01)

(52) U.S. Cl.
CPC .......... *G06F 3/1286* (2013.01); *G06F 3/1209* (2013.01); *G06F 3/1236* (2013.01); *G06F 3/1279* (2013.01)

(58) Field of Classification Search
CPC .... G06F 3/1286; G06F 3/1209; G06F 3/1236; G06F 3/1279

(Continued)

(56) References Cited

U.S. PATENT DOCUMENTS

| | | | |
|---|---|---|---|
| 2004/0017580 A1* | 1/2004 | Kuroda | G06F 3/1204 358/1.13 |
| 2015/0242987 A1* | 8/2015 | Lee | G06T 1/20 345/522 |

(Continued)

FOREIGN PATENT DOCUMENTS

| | | |
|---|---|---|
| JP | 2017-536598 A | 12/2017 |
| JP | 2019-185524 A | 10/2019 |
| WO | 2016/048417 A1 | 3/2016 |

*Primary Examiner* — Allen H Nguyen
(74) *Attorney, Agent, or Firm* — Kenealy Vaidya LLP

(57) ABSTRACT

A non-transitory computer-readable medium storing a program readable by a computer of a terminal management apparatus in a terminal management system where a first system transferring information between the terminal management apparatus and a first terminal apparatus via a relay apparatus and a second system transferring information between the terminal management apparatus and a second terminal apparatus without passing through the relay apparatus coexist, the program causing the terminal management apparatus to perform: when an instruction received from an external apparatus, determining a transmission destination; when the transmission destination is the second terminal apparatus, dividing the received instruction into a plurality of transmission units and transmitting an instruction included in each transmission unit to the second terminal apparatus; and when the transmission destination is the first terminal apparatus, transmitting the received instruction to the relay apparatus without being divided.

15 Claims, 5 Drawing Sheets

(58) Field of Classification Search
USPC ........................................................ 358/1.15
See application file for complete search history.

(56) References Cited

U.S. PATENT DOCUMENTS

| | | | |
|---|---|---|---|
| 2015/0373211 A1* | 12/2015 | Minamikawa | H04N 1/00474 |
| | | | 358/1.15 |
| 2016/0224291 A1* | 8/2016 | Ishino | G06F 3/1236 |
| 2019/0319922 A1 | 10/2019 | Nishizaki | |
| 2020/0395998 A1* | 12/2020 | Yamamoto | H04B 7/15557 |

* cited by examiner

NON-TRANSITORY COMPUTER-READABLE MEDIUM, TERMINAL MANAGEMENT APPARATUS AND TERMINAL MANAGEMENT SYSTEM CONFIGURED TO TRANSMIT A RECEIVED INSTRUCTION TO A RELAY APPARATUS WITHOUT BEING DIVIDED

CROSS-REFERENCE TO RELATED APPLICATIONS

This application is based on and claims priority under 35 USC 119 from Japanese Patent Application No. 2020-001474 filed on Jan. 8, 2020, the contents of which are incorporated herein by reference.

TECHNICAL FIELD

The present disclosure relates to a non-transitory computer-readable medium storing a terminal management processing program, a terminal management apparatus and a terminal management system.

BACKGROUND

A related-art technology suggests managing a printer having no function of directly connecting to the Internet by a management server connected to the Internet.

SUMMARY

One illustrative aspect of the present disclosure provides a non-transitory computer-readable medium storing a terminal management processing program readable by a computer of a terminal management apparatus in a terminal management system where a first system and a second system coexist, the first system including the terminal management apparatus, a relay apparatus and a first terminal apparatus, the terminal management apparatus being configured to communicate with the relay apparatus, the relay apparatus being configured to communicate with the first terminal apparatus, the first system being configured to, in a case transferring information between the terminal management apparatus and the first terminal apparatus, transfer the information via the relay apparatus, the second system including the terminal management apparatus and a second terminal apparatus, the terminal management apparatus being configured to communicate with the second terminal apparatus, and the second system being configured to, when transferring information between the terminal management apparatus and the second terminal apparatus, transfer the information without passing through the relay apparatus, the terminal management processing program, when executed by the computer, causing the terminal management apparatus to perform: in a case transmitting an instruction received from an external apparatus to a transmission destination, determining whether the transmission destination is the relay apparatus or the second terminal apparatus; in a case it is determined that the transmission destination is the relay apparatus, transmitting the received instruction to the relay apparatus; and in a case it is determined that the transmission destination is the second terminal apparatus, transmitting the received instruction to the second terminal apparatus, wherein in the transmitting of the received instruction to the second terminal apparatus, the terminal management processing program causes the terminal management apparatus to perform: dividing the received instruction into a plurality of transmission units; and transmitting an instruction included in each transmission unit to the second terminal apparatus, and wherein in the transmitting of the received instruction to the first terminal apparatus, the terminal management processing program causes the terminal management apparatus to perform transmitting the received instruction to the relay apparatus without being divided.

According to the above configuration, even though the second terminal apparatus does not have processing performance capable of treating an undivided instruction, the second terminal apparatus can appropriately receive and treat an instruction as long as the instruction is each of the divided instructions. On the other hand, when an instruction is transmitted from the terminal management apparatus to the relay apparatus, the instruction is transmitted without being divided. For this reason, when the relay apparatus has processing performance capable of treating even an undivided instruction, it is not necessary to transmit each of the divided instructions, so that it is possible to increase transmission efficiency. Therefore, even when the second terminal apparatus having relatively low processing performance and the relay apparatus having relatively high processing performance coexist, it is possible to transmit the instruction to each of the apparatuses in a favorable method corresponding to the performance of each of the apparatuses.

BRIEF DESCRIPTION OF DRAWINGS

Illustrative embodiments of the disclosure will be described in detail based on the following figures, wherein.

DETAILED DESCRIPTION

The above-described related art does not disclose technology for a printer having a function of directly connecting to the Internet. Specifically, the above-described related art does not disclose technology of appropriately managing a printer having no function of directly connecting to the Internet and a printer having a function of directly connecting to the Internet in environments where the printers coexist.

Therefore, illustrative aspects of the present disclosure provide a terminal management processing program, a terminal management apparatus and a terminal management system capable of appropriately managing terminal apparatuses having different communication functions.

In the below, the terminal management processing program, the terminal management apparatus and the terminal management system are described with reference to illustrative embodiments.

(1) Configuration of Terminal Management System 1

Figure 1:
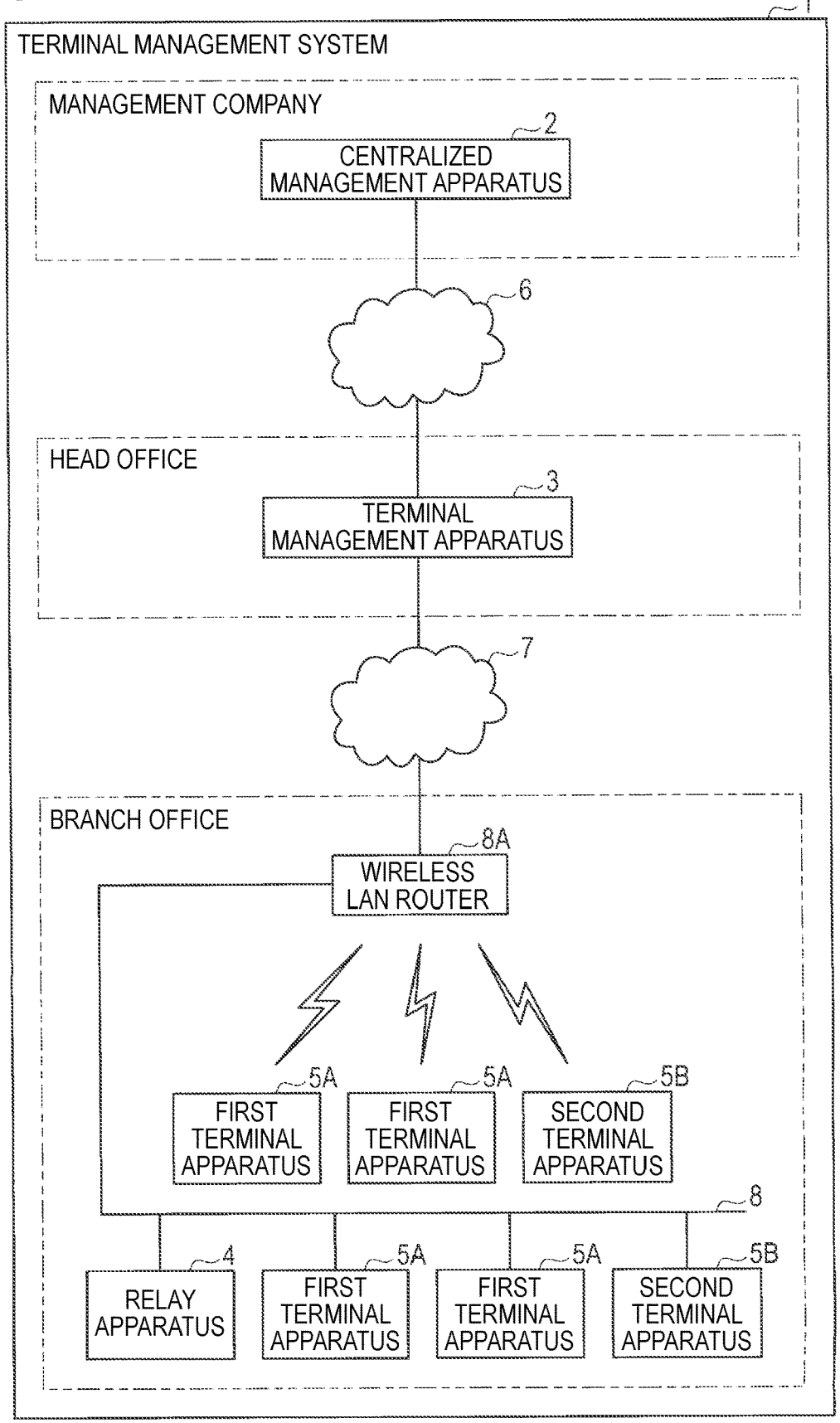
FIG. 1 is a block diagram depicting a configuration of a terminal management system.

As shown in FIG. 1, a terminal management system 1 includes a centralized management apparatus 2, a terminal management apparatus 3, a relay apparatus 4, a first terminal apparatus 5A, and the second terminal apparatus 5B. In descriptions below, when it is not necessary to explicitly distinguish between the first terminal apparatus 5A and the second terminal apparatus 5B, the first terminal apparatus 5A and the second terminal apparatus 5B are also each referred to as a terminal apparatus 5. As shown in FIG. 1, the centralized management apparatus 2 and the terminal management apparatus 3 are configured to be able to communicate with each other via a WAN (abbreviation of Wide Area Network) 6. The terminal management apparatus 3 and the relay apparatus 4 are configured to be able to communicate with each other via a WAN 7 and a LAN (abbreviation of Local Area Network) 8. The relay apparatus 4 and the first terminal apparatus 5A are configured to be able to communicate with each other via the LAN 8. The terminal management apparatus 3 and the second terminal apparatus 5B are configured to be able to communicate with each other via the WAN 7 and the LAN 8. The WAN is an abbreviation of Wide Area Network. The LAN is an abbreviation of Local Area Network. The WAN 6 and the WAN 7 may be the same networks or may be separate networks. In the present illustrative embodiment, the Internet is used for both the WAN 6 and the WAN 7.

The WAN 7 and the LAN 8 are connected to each other via a wireless LAN router 8A. The wireless LAN router 8A is a device having both a router function and a wireless LAN access point function. The wireless LAN router 8A has a firewall function, and is configured to prevent unauthorized access from the WAN 7-side to the LAN 8-side. The wireless LAN router 8A is connected to a LAN cable. The LAN 8 is configured by a combination of a wired LAN and a wireless LAN.

The terminal apparatus 5 may include a terminal apparatus 5 that can connect to the wireless LAN and a terminal apparatus 5 that can connect to the wired LAN. Examples of the terminal apparatus 5 that can connect to the wireless LAN include a printer (hereinbelow, also referred to as a mobile printer) that is used in conjunction with a mobile terminal. The terminal apparatus 5 that can connect to the wireless LAN establishes a communication link with the wireless LAN router 8A when it exists in a communication area with the wireless LAN router 8A, and is incorporated in the terminal management system 1. Examples of the terminal apparatus 5 that can connect to the wired LAN include a wireless LAN incompatible type printer or MFP (abbreviation of Multi Function Peripheral).

In the terminal management system 1 of the present illustrative embodiment, for example, it is possible to collect information from the terminal apparatus 5 in the centralized management apparatus 2, and to implement test printing in the terminal apparatus 5, restart of the terminal apparatus 5 and shutdown of the terminal apparatus 5 by a remote operation on the centralized management apparatus 2. In the present illustrative embodiment, the terminal management apparatus 3 is configured to function as a server apparatus in a client/server system. The centralized management apparatus 2, the relay apparatus 4 and the second terminal apparatus 5B are each configured to function as a client apparatus in the client/server system. When transferring information between each of the centralized management apparatus 2, the relay apparatus 4 and the second terminal apparatus 5B and the terminal management apparatus 3, information is transmitted from the client apparatus to the server apparatus, and information as a response thereto is transmitted from the server apparatus to the client apparatus. Note that, the first terminal apparatus 5A has no function of communicating with other apparatuses via the WAN 7. For this reason, the information is transferred between the terminal management apparatus 3 and the first terminal apparatus 5A via the relay apparatus 4.

As an example of a place in which each of the apparatuses configuring the terminal management system 1 is equipped, a case where the terminal management apparatus 3 is equipped at a head office of a company A and the relay apparatus 4 and the terminal apparatus 5 are equipped at a branch office of the company A may be considered. In this case, information (hereinbelow, also referred to as terminal information) about a plurality of terminal apparatuses 5 that is managed at the branch office of the company A is collected by the terminal management apparatus 3 equipped at the head office of the company A. The terminal information collected by the terminal management apparatus 3 is collected and managed by the centralized management apparatus 2 that is operated by a management company different from the company A, for example. However, the centralized management apparatus 2 may also be operated by the company A, and it is optional whether the company A and the management company are separate companies.

Although not shown in FIG. 1, there may also be a plurality of terminal management apparatuses 3. In this case, the plurality of terminal management apparatuses 3 may be managed by one centralized management apparatus 2. For example, the terminal management apparatus 3 may be further equipped at each of companies B, C, D, . . . different from the company A, and the plurality of terminal management apparatuses 3 may be managed by one centralized management apparatus 2 equipped at the management company.

Although not shown in FIG. 1, there may also be a plurality of relay apparatuses 4. In this case, the plurality of relay apparatuses 4 may be managed by one terminal management apparatus 3. For example, in a case where the company A has a plurality of branch offices, the relay apparatuses 4 may be each equipped at the branch offices, and the plurality of relay apparatuses 4 may be managed by one terminal management apparatus 3 equipped at the head office.

Figure 2A:
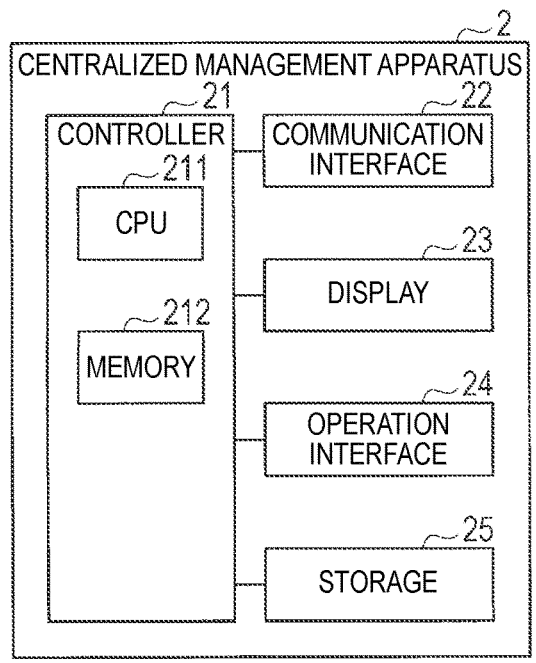
FIG. 2A is a block diagram depicting a configuration of a centralized management apparatus.

As shown in FIG. 2A, the centralized management apparatus 2 includes a controller 21, a communication interface 22, a display 23, an operation interface 24 and a storage 25. The controller 21 includes a CPU (abbreviation of Central Processing Unit) 211 and a memory 212. The CPU 211 is configured to execute processing and control according to software stored in the memory 212, thereby implementing a variety of functions of the centralized management apparatus 2. However, the present disclosure is not limited to the configuration where the diverse functions of the centralized management apparatus 2 are implemented by the CPU 211 and the software. For example, some or all of the functions may also be implemented by one or more hardware.

The memory 212 includes a semiconductor memory (for example, a ROM (abbreviation of Read Only Memory), a RAM (abbreviation of Random Access Memory), an NVRAM (abbreviation of Non-Volatile RAM) and a flash memory) that is a non-transitory tangible recording medium. The memory 212 stores software and data. The communication interface 22 includes a network interface controller that can connect to the WAN 6 and perform communication via the WAN 6. The display 23 includes a display device (for example, a liquid crystal monitor or an organic EL (abbreviation of Electro Luminescence) display), and is configured to display diverse images. The operation interface 24 includes an input device for receiving a variety of input operations and an input controller for processing an input from the input device. The storage 25 is configured by an auxiliary storage device such as an HDD (abbreviation of Hard Disk Drive) and an SSD (abbreviation of Solid State Drive), for example.

Figure 2B:
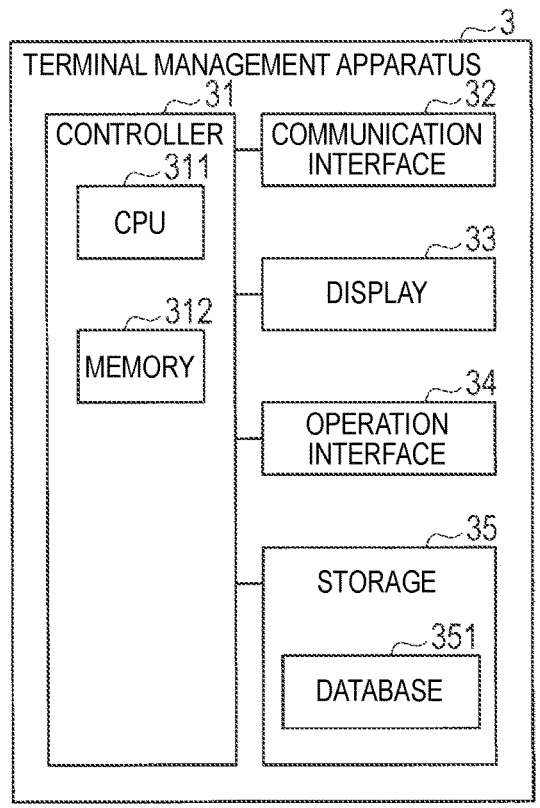
FIG. 2B is a block diagram depicting a configuration of a terminal management apparatus.

As shown in FIG. 2B, the terminal management apparatus 3 includes a controller 31, a communication interface 32, a display 33, an operation interface 34 and a storage 35. The controller 31 includes a CPU 311 and a memory 312. The CPU 311 is configured to execute processing and control according to software stored in the memory 312, thereby implementing a variety of functions of the terminal management apparatus 3. However, the present disclosure is not limited to the configuration where the diverse functions of the terminal management apparatus 3 are implemented by the CPU 311 and the software. For example, some or all of the functions may also be implemented by one or more hardware.

The memory 312 includes a semiconductor memory (for example, a ROM, a RAM, an NVRAM and a flash memory) that is a non-transitory tangible recording medium. The memory 312 stores software and data. The communication interface 32 includes a network interface controller that can connect to the WAN 6 and perform communication via the WAN 6. Note that, in the present illustrative embodiment, since the WAN 6 and the WAN 7 are the same networks, the communication interface 32 can also connect to the WAN 7 and perform communication via the WAN 7. The display 33 includes a display device (for example, a liquid crystal monitor or an organic EL display), and is configured to display diverse images. The operation interface 34 includes an input device for receiving a variety of input operations and an input controller for processing an input from the input device. The storage 35 is configured by an auxiliary storage device such as an HDD and an SSD, for example. In the storage 35, a database 351 is configured (hereinbelow, the database 351 is abbreviated as the DB 351). When the terminal management apparatus 3 executes processing that will be described later, a variety of data is registered on the DB 351 and update and deletion of the data are executed.

Figure 2C:
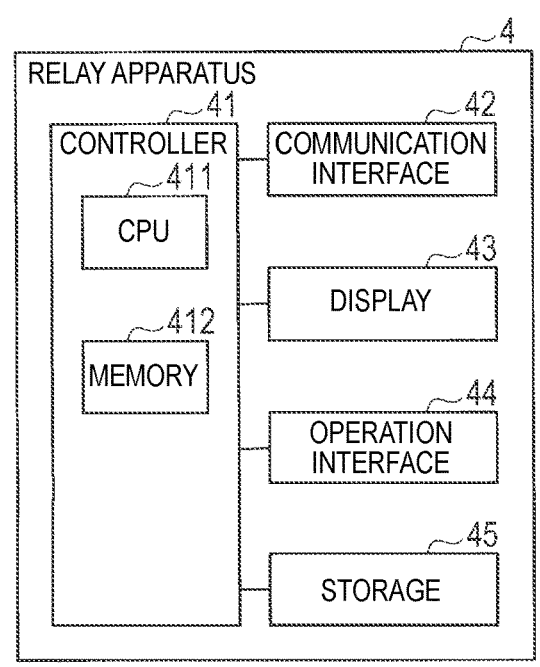
FIG. 2C is a block diagram depicting a configuration of a relay apparatus.

As shown in FIG. 2C, the relay apparatus 4 includes a controller 41, a communication interface 42, a display 43, an operation interface 44 and a storage 45. The controller 41 includes a CPU 411 and a memory 412. The CPU 411 is configured to execute processing and control according to software stored in the memory 412, thereby implementing a variety of functions of the relay apparatus 4. However, the present disclosure is not limited to the configuration where the diverse functions of the relay apparatus 4 are implemented by the CPU 411 and the software. For example, some or all of the functions may also be implemented by one or more hardware.

The memory 412 includes a semiconductor memory (for example, a ROM, a RAM, an NVRAM and a flash memory) that is a non-transitory tangible recording medium. The memory 412 stores software and data. The communication interface 42 includes a network interface controller that can connect to the WAN 7 and perform communication via the WAN 7, and a network interface controller that can connect to the LAN 8 and perform communication via the LAN 8. The display 43 includes a display device (for example, a liquid crystal monitor or an organic EL display), and is configured to display diverse images. The operation interface 44 includes an input device for receiving a variety of input operations and an input controller for processing an input from the input device. The storage 45 is configured by an auxiliary storage device such as an HDD and an SSD, for example.

Figure 2D:
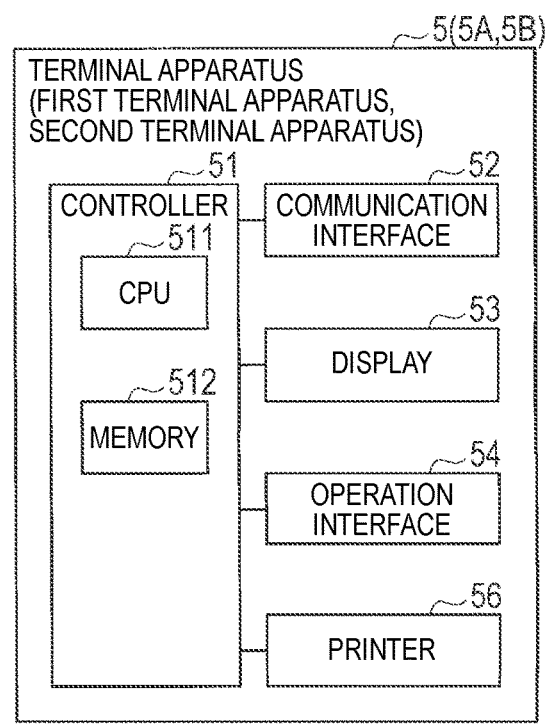
FIG. 2D is a block diagram depicting a configuration of a terminal apparatus.

As shown in FIG. 2D, the terminal apparatus 5 includes a controller 51, a communication interface 52, a display 53, an operation interface 54 and a printer 56. The first terminal apparatus 5A and the second terminal apparatus 5B are different in terms of performance of hardware, and firmware and software installed in each of the apparatuses. However, the differences are not shown in FIG. 2D. The controller 51 includes a CPU 511 and a memory 512. The CPU 511 is configured to execute processing and control according to software stored in the memory 512, thereby implementing a variety of functions of the terminal apparatus 5. However, the present disclosure is not limited to the configuration where the diverse functions of the terminal apparatus 5 are implemented by the CPU 511 and the software. For example, some or all of the functions may also be implemented by one or more hardware.

The memory 512 includes a semiconductor memory (for example, a ROM, a RAM, an NVRAM and a flash memory) that is a non-transitory tangible recording medium. The memory 512 stores software and data. The communication interface 52 includes a network interface controller that can connect to the LAN 8 and perform communication via the LAN 8. For example, in a case where the terminal apparatus 5 is a wireless LAN compatible type mobile printer, a network interface controller corresponding to wireless LAN standards is provided as the communication interface 52. In a case where the terminal apparatus 5 is a wired LAN compatible type printer, a network interface controller corresponding to wired LAN standards is provided as the communication interface 52.

The display 53 includes a display device (for example, a liquid crystal monitor or an organic EL display), and is configured to display diverse images. The operation interface 54 includes an input device for receiving a variety of input operations and an input controller for processing an input from the input device. The printer 56 has a thermal printing mechanism and is configured to perform printing on a thermal roll sheet. However, the printer 56 may also be configured to perform printing on a cut sheet. Alternatively, the printer 56 may also be configured to print an image by a well-known (for example, an inkjet method or an electrophotographic method) other than the thermal method.

(2) Outline of Operations of Terminal Management System 1

In the present illustrative embodiment, the terminal management system 1 operates as follows. When a relay processing program is installed in a computer and is then activated, the computer starts processing as the relay apparatus 4. When the relay processing program is activated, the relay apparatus 4 accesses the terminal management apparatus 3 via the WAN 7 and transmits a registration request of the relay apparatus 4 to the terminal management apparatus 3. Also, when the second terminal apparatus 5B is activated, the second terminal apparatus 5B accesses the terminal management apparatus 3 via the WAN 7 and transmits a registration request of the second terminal apparatus 5B to the terminal management apparatus 3.

When the registration request from the relay apparatus 4 or the second terminal apparatus 5B is received, the terminal management apparatus 3 executes client registration processing. In the client registration processing, the terminal management apparatus 3 determines whether a transmission source of the registration request (i.e., the relay apparatus 4 or the second terminal apparatus 5B) is already registered on the DB 351. When the transmission source is not registered on the terminal management apparatus 3, the information of the transmission source is registered on the DB 351.

Subsequently, the terminal management apparatus 3 registers action information, which indicates that periodic processing is to be executed as an action that should be executed by each of the relay apparatus 4 and the second terminal apparatus 5B, on the DB 351. The action information is registered on the DB 351, as periodic information. The periodic information is information that is kept registered on the DB 351 without being deleted as long as deletion thereof is not instructed by a command transmitted from the centralized management apparatus 2 to the terminal management apparatus 3 or a command input by a user operation on the terminal management apparatus 3. When each of the relay apparatus 4 and the second terminal apparatus 5B starts to operate, each of the relay apparatus 4 and the second terminal apparatus 5B executes the periodic processing, and periodically inquires of the terminal management apparatus 3 whether there is an action that should be treated in each of the relay apparatus 4 and the second terminal apparatus 5B.

When inquired from the relay apparatus 4 and the second terminal apparatus 5B, the terminal management apparatus 3 executes instruction transmission processing. The instruction transmission processing will be described in detail later. When the terminal management apparatus 3 executes the instruction transmission processing, if action information about an action that should be treated in each of the relay apparatus 4 and the second terminal apparatus 5B is registered on the DB 351, the terminal management apparatus 3 returns the action information to each of the relay apparatus 4 and the second terminal apparatus 5B. At the time of first inquiry from each of the relay apparatus 4 and the second terminal apparatus 5B, the action information indicating that the periodic processing is to be executed is returned to the relay apparatus 4 and the second terminal apparatus 5B. The relay apparatus 4 and the second terminal apparatus 5B obtain the action information indicating that the periodic processing is to be executed, and thereafter repeatedly execute the periodic processing whenever an interval elapses, according to an interval setting included in the action information.

The relay apparatus 4 searches for the first terminal apparatus 5A, which is to be a management target by SNMP (Simple Network Management Protocol), on the LAN 8. When the first terminal apparatus 5A that is to be a management target is found, the relay apparatus 4 transmits a registration request of terminal information about the first terminal apparatus 5A to the terminal management apparatus 3. The terminal management apparatus 3 that receives the registration request of the terminal information registers the terminal information on the DB 351.

When a command is input to the relay apparatus 4, the first terminal apparatus 5A or the second terminal apparatus 5B by a user operation on the centralized management apparatus 2, the command is transmitted from the centralized management apparatus 2 to the terminal management apparatus 3. The command may also be input to the relay apparatus 4, the first terminal apparatus 5A or the second terminal apparatus 5B by a user operation on the terminal management apparatus 3. When the command transmitted from the centralized management apparatus 2 or the command input from the terminal management apparatus 3 is received, the terminal management apparatus 3 executes instruction storing processing.

In the instruction storing processing, action information corresponding to the command transmitted from the centralized management apparatus 2 or the command input from the terminal management apparatus 3 is registered on the DB 351. This action information includes action information that is registered as the periodic information as described above, and action information that is registered as one-off information. The one-off information is information that, when processing corresponding to the one-off information is executed in the first terminal apparatus 5A or the second terminal apparatus 5B, is thereafter deleted from the DB 351.

For example, when the command transmitted from the centralized management apparatus 2 to the terminal management apparatus 3 or the command input by the user operation on the terminal management apparatus 3 is a test printing or restart command for the first terminal apparatus 5A or the second terminal apparatus 5B, the terminal management apparatus 3 registers action information corresponding the command for the first terminal apparatus 5A or the second terminal apparatus 5B on the DB 351. This action information is registered on the DB 351, as one-off information.

As described above, the relay apparatus 4 and the second terminal apparatus 5B periodically inquire of the terminal management apparatus 3 whether there is an action that should be treated in the relay apparatus 4. When the inquiries from the relay apparatus 4 and the second terminal apparatus 5B are received, the terminal management apparatus 3 executes instruction transmission processing that will be described later. If the one-off information is kept registered on the DB 351 at the time when the terminal management apparatus 3 executes the instruction transmission processing, the terminal management apparatus 3 returns the action information (i.e., the one-off information) to the relay apparatus 4 or the second terminal apparatus 5B. In a case of the relay apparatus 4, the relay apparatus 4 transfers the command to the first terminal apparatus 5A, based on the returned action information. Thereby, test printing or restart is executed in the first terminal apparatus 5A. In a case of the second terminal apparatus 5B, the second terminal apparatus 5B executes test printing or restart, based on the returned action information.

When the processing is executed in the first terminal apparatus 5A, the relay apparatus 4 transmits a result of the execution and an action deletion request intended to complete an action in the first terminal apparatus 5A to the terminal management apparatus 3. When the processing is executed in the second terminal apparatus 5B, the second terminal apparatus 5B transmits a result of the execution and an action deletion request intended to complete an action in the second terminal apparatus 5B to the terminal management apparatus 3. The terminal management apparatus 3 deletes the information corresponding to the deletion requests from the DB 351.

When the user wants to change the interval of the periodic processing that is periodically executed in the relay apparatus 4 and the second terminal apparatus 5B, the user can also register action information for instructing a change in interval of the periodic processing on the DB 351 by the command transmitted from the centralized management apparatus 2 to the terminal management apparatus 3 or the command input by the user operation on the terminal management apparatus 3. This action information is registered on the DB 351, as one-off information.

As described above, the relay apparatus 4 and the second terminal apparatus 5B periodically inquire of the terminal management apparatus 3 whether there is an action that should be treated in the relay apparatus 4. When the inquiries from the relay apparatus 4 and the second terminal apparatus 5B are received, the terminal management apparatus 3 executes instruction transmission processing that will be described later. If the one-off information is kept registered on the DB 351 at the time when the terminal management apparatus 3 executes the instruction transmission processing, the terminal management apparatus 3 returns the action information (i.e., the one-off information) to each of the relay apparatus 4 and the second terminal apparatus 5B. The relay apparatus 4 and the second terminal apparatus 5B change the interval of the periodic processing that is executed by each of the relay apparatus 4 and the second terminal apparatus 5B, based on the returned action information. When the interval change is executed, the relay apparatus 4 and the second terminal apparatus 5B transmit a result of the execution and an action deletion request intended to complete an action in each of the relay apparatus 4 and the second terminal apparatus 5B to the terminal management apparatus 3. The terminal management apparatus 3 deletes the information corresponding to the deletion requests from the DB 351. Each of the relay apparatus 4 and the second terminal apparatus 5B that receive an interval change instruction resumes the periodic processing at the instructed interval.

(3) Instruction Transmission Processing That Is Executed By Terminal Management Apparatus 3

Subsequently, the instruction transmission processing that is executed in the terminal management apparatus 3 is described. In the terminal management apparatus 3, the CPU 311 executes processing according to the terminal management processing program stored in the memory 312, and the instruction transmission processing is executed as a part of the processing. In descriptions below, three illustrative embodiments are exemplified.

(3.1) First Illustrative Embodiment

Figure 3:
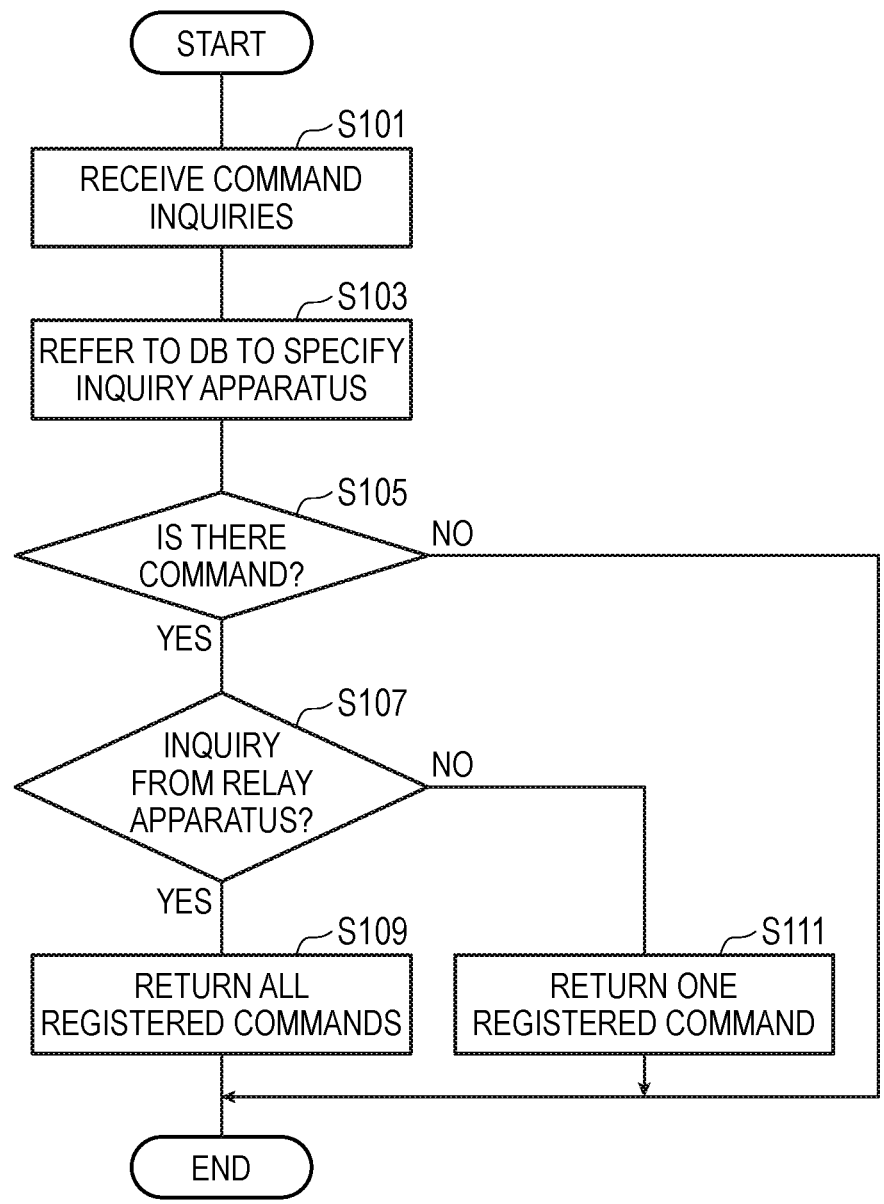
FIG. 3 is a flowchart depicting instruction transmission processing of a first illustrative embodiment.

In a first illustrative embodiment, the terminal management apparatus 3 is configured to execute instruction transmission processing shown in FIG. 3. When the instruction transmission processing shown in FIG. 3 starts, the terminal management apparatus 3 receives command inquiries from the relay apparatus 4 and the second terminal apparatus 5B (S101). The relay apparatus 4 and the second terminal apparatus 5B transmit the command inquiries to the terminal management apparatus 3 by using HTTP method "GET".

The terminal management apparatus 3 refers to the DB 351 to specify the inquiry apparatus (i.e., any one of the relay apparatus 4 and the second terminal apparatus 5B included in the terminal management system 1), based on the information included in the inquiries from the relay apparatus 4 and the second terminal apparatus 5B (S103). Subsequently, the terminal management apparatus 3 determines whether there is a command for the inquiry apparatus specified in S103 (S105). In S105, the terminal management apparatus 3 searches the DB 351 to determine whether the action information associated with the inquiry apparatus is registered on the DB 351. When it is determined that the action information associated with the inquiry apparatus is registered on the DB 351, the terminal management apparatus 3 determines that there is a command for the inquiry apparatus. When it is determined that that the action information associated with the inquiry apparatus is not registered on the DB 351, the terminal management apparatus 3 determines that there is no command for the inquiry apparatus.

When it is determined in S103 that there is no command (S105: NO), the instruction transmission processing shown in FIG. 3 is over. On the other hand, when it is determined in S103 that there is a command (S105: YES), the terminal management apparatus 3 determines whether the inquiry is an inquiry from the relay apparatus 4 (S107). When it is determined in S107 that the inquiry is an inquiry from the relay apparatus 4 (S107: YES), the terminal management apparatus 3 returns all commands registered on the DB 351 to the inquiry apparatus (i.e., the relay apparatus 4) (S109). When the processing of S109 is completed, the instruction transmission processing shown in FIG. 3 is over.

On the other hand, when it is determined in S107 that the inquiry is not an inquiry from the relay apparatus 4 (S107: NO), the inquiry apparatus is the second terminal apparatus 5B. In this case, the terminal management apparatus 3 returns one of the command registered on the DB 351 to the inquiry apparatus (i.e., the second terminal apparatus 5B) (S111). When the processing of S111 is completed, the instruction transmission processing shown in FIG. 3 is over.

A plurality of commands may be registered on the DB 351, as a command for an inquiry apparatus. In a case where the inquiry apparatus is the relay apparatus 4, when the instruction transmission processing is executed in the terminal management apparatus 3, all the commands registered on the DB 351 are transmitted from the terminal management apparatus 3 to the relay apparatus 4 by the processing of S109. On the other hand, in a case where the inquiry apparatus is the second terminal apparatus 5B, when the instruction transmission processing is executed in the terminal management apparatus 3, one of the commands registered on the DB 351 is transmitted from the terminal management apparatus 3 to the second terminal apparatus 5B by the processing of S111. In this case, when unsent commands other than the transmitted command are registered on the DB 351, the unsent commands are transmitted one by one each time that the command inquiry is received from the second terminal apparatus 5B.

The relay apparatus 4 is configured by, for example, a PC (personal computer). For this reason, a capacity of the memory 312 is sufficiently large in many cases. On the other hand, the second terminal apparatus 5B is, for example, a mobile printer, so that a capacity of the memory 512 is generally not so large as the PC. In this respect, in the instruction transmission processing, when transmitting the instruction (i.e., the command registered on the DB 351) to the relay apparatus 4, the commands registered on the DB 351 are all transmitted. For this reason, it is not necessary to divide the command into a plurality of transmission units and to transmit the same in each division unit, so that it is possible to increase the transmission efficiency. On the other hand, when transmitting the instruction to the second terminal apparatus 5B, all the commands registered on the DB 351 are not transmitted. For this reason, even in a case where the capacity of the memory 512 of the second terminal apparatus 5B is small, if the instruction is divided into a plurality of transmission units, it is possible to suppress the capacity of the memory 512 from being insufficient even when the instruction included in each division unit is received. That is, even when the second terminal apparatus 5B having relatively low processing performance and the relay apparatus 4 having relatively high processing performance coexist, it is possible to transmit the instruction to each of the apparatuses in a favorable method corresponding to the performance of each of the apparatuses.

(3.2) Second Illustrative Embodiment

Figure 4:
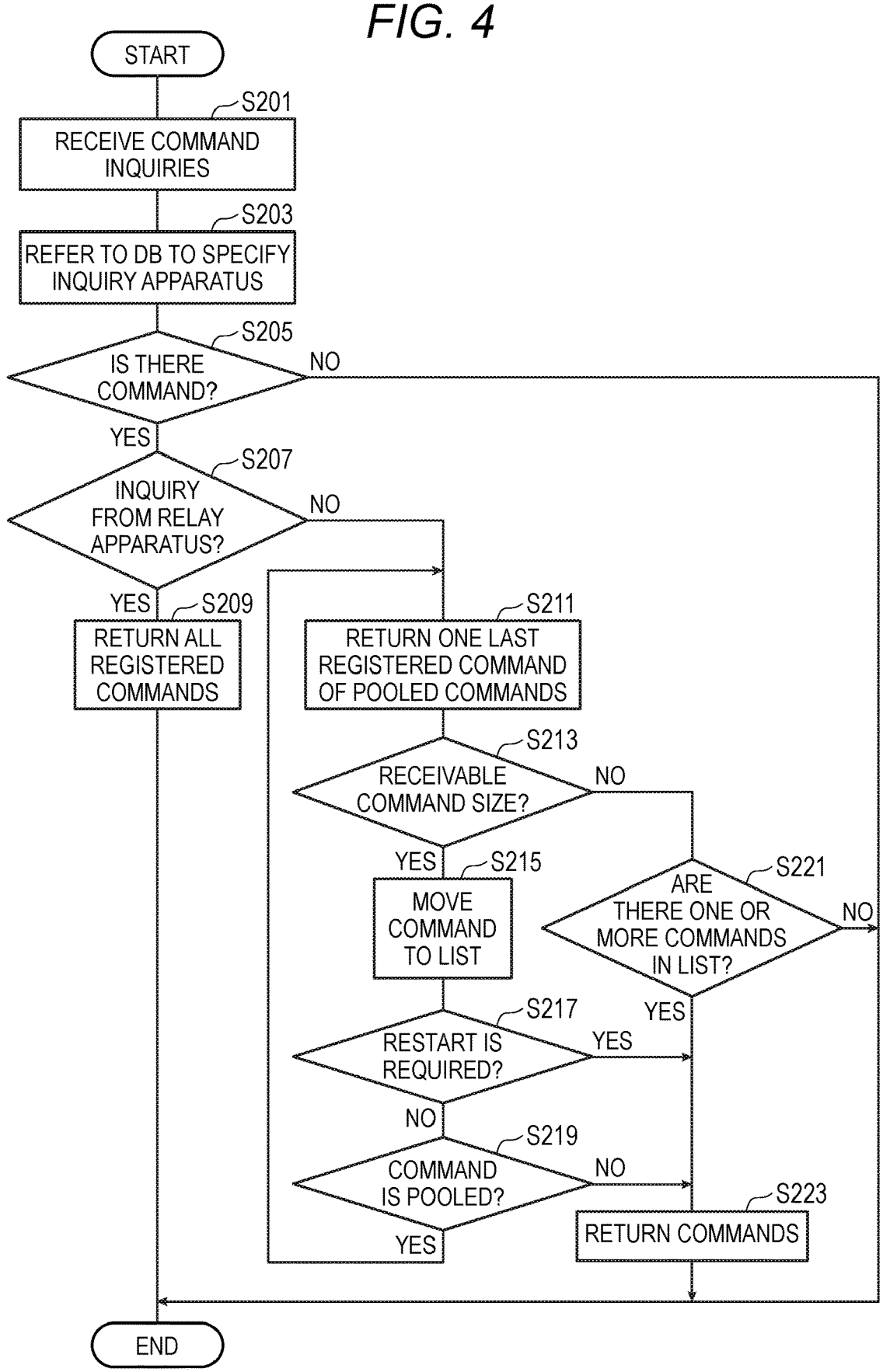
FIG. 4 is a flowchart depicting instruction transmission processing of a second illustrative embodiment.

In a second illustrative embodiment, the terminal management apparatus 3 is configured to execute instruction transmission processing shown in FIG. 4. In FIG. 4, each processing step from S201 to S209 is equivalent to each processing step from S101 to S109 described in the first illustrative embodiment. That is, when the instruction transmission processing shown in FIG. 4 starts, the terminal management apparatus 3 receives the command inquiries from the relay apparatus 4 and the second terminal apparatus 5B (S201). Subsequently, the terminal management apparatus 3 refers to the DB 351 to specify the inquiry apparatus (S203).

Subsequently, the terminal management apparatus 3 determines whether there is a command for the inquiry apparatus specified in S203 (S205). When it is determined in S205 that there is no command (S205: NO), the instruction transmission processing shown in FIG. 4 is over. On the other hand, when it is determined in S205 that there is a command (S205: YES), the terminal management apparatus 3 determines whether the inquiry is an inquiry from the relay apparatus 4 (S207).

When it is determined in S207 that the inquiry is an inquiry from the relay apparatus 4 (S207: YES), the terminal management apparatus 3 returns all of the commands registered on the DB 351 to the inquiry apparatus (i.e., the relay apparatus 4) (S209). When the processing of S209 is completed, the instruction transmission processing shown in FIG. 4 is over. On the other hand, when it is determined in S207 that the inquiry is not an inquiry from the relay apparatus 4 (S207: NO), the inquiry apparatus is the second terminal apparatus 5B. In this case, the terminal management apparatus 3 selects one command that is the last registered command from pooled commands (S211). The pooled command in S211 is a command that has not been yet selected in S211 from the commands registered on the DB 351. In the meantime, in S211, one command that is the first registered command may be selected from the pooled commands. That is, in S211, one command may be selected in a reverse order to a registration order on the DB 351 (so-called, LIFO) or may be selected in the same order as the registration order on the DB 351 (so-called, FIFO).

Subsequently, the terminal management apparatus 3 determines whether the command has a receivable command size (S213). In S213, it is determined whether a data amount D2 of the command selected in S211 satisfies an inequality $D2 \leq D1-D3$, based on a data amount D1 that can be received by the second terminal apparatus 5B, the data amount D2 and a data amount D3 of commands included in a list. In order to enable even the second terminal apparatus 5B to receive all commands, the data amount D2 of one command is designed to satisfy an inequality $D2 \leq D1$. Also, when executing first the processing of S213, the data amount D3 is 0.

For this reason, when executing first the processing of S213, it is determined in S213 that the command has a receivable command size (S213: YES), and the terminal management apparatus 3 moves the command selected in S211 to the list (S215). In the meantime, when the processing of S215 is executed, the data amount D3 of the commands included in the list is updated to a value obtained by adding the data amount D2 to the data amount D3 (i.e., $D3=D3+D2$).

Subsequently, the terminal management apparatus 3 determines whether restart is necessary (S217). In S217, it is determined whether the command selected in S211 (i.e., the command moved to the list in S215) is a command to restart the second terminal apparatus 5B. When it is determined in S217 that restart is not necessary (S217: NO), the terminal management apparatus 3 determines whether a command is pooled (S219).

In S219, the terminal management apparatus 3 determines whether a command not selected yet in S211 remains in the commands registered on the DB 351. When it is determined in S219 that a command is pooled (S219: YES), the flow returns to S211. Thereby, the processing steps of S211 and thereafter are re-executed. When the processing steps from S211 to S219 are repeatedly executed, the command selected in S211 is moved to the list in S215, so that the data amount D3 of the commands included in the list increases.

As a result, it may be determined in S213 that the command does not have a receivable command size (S213: NO). That is, the data amount D2 of the command selected in S211 may not satisfy the inequality $D2 \leq D1-D3$. In this case, the terminal management apparatus 3 determines whether there are one or more commands in the list (S221). When it is determined in S221 that there are one or more commands in the list (S221: YES), the terminal management apparatus 3 returns the commands included in the list to the inquiry apparatus (i.e., the second terminal apparatus 5B) (S223).

That is, in the instruction transmission processing shown in FIG. 4, in a case where the data amount D3 of the commands accumulated in the list is likely to exceed the data amount D1 that can be received by the second terminal apparatus 5B, the commands accumulated in the list are transmitted the second terminal apparatus 5B at a point of time just before that. When the processing of S223 is completed, the instruction transmission processing shown in FIG. 4 is over. On the other hand, when it is determined in S221 that there is no command in the list (S221: NO), the instruction transmission processing shown in FIG. 4 is over without executing the processing of S223.

In S217, it may be determined that restart is necessary (S217: YES). In this case, the terminal management apparatus 3 returns the commands included in the list to the inquiry apparatus (i.e., the second terminal apparatus 5B) (S223). When the processing of S223 is completed, the instruction transmission processing shown in FIG. 4 is over. That is, in the instruction transmission processing shown in FIG. 4, the pooled commands are selected one by one, and when a command that does not require restart is selected, the processing of accumulating a command in the list is continuously executed, and when a command that requires restart is selected, the commands accumulated up to that point of time are transmitted to the second terminal apparatus 5B.

It may also be determined in S219 that a command is not pooled (S219: NO). In this case, the terminal management apparatus 3 returns the commands included in the list to the inquiry apparatus (i.e., the second terminal apparatus 5B) (S223). When the processing of S223 is completed, the instruction transmission processing shown in FIG. 4 is over. That is, in the instruction transmission processing shown in FIG. 4, when there is no pooled command, the commands accumulated in the list up to that point of time are transmitted to the second terminal apparatus 5B, and the instruction transmission processing is over.

Also in the second illustrative embodiment configured as described above, the similar operations and effects to the first illustrative embodiment are achieved, and it is possible to transmit the instructions of data amounts, which are suitable for each of the relay apparatus 4 having a relatively large memory capacity and the second terminal apparatus 5B having a relatively small memory capacity, to each of the relay apparatus 4 and the second terminal apparatus 5B. Also, in the first illustrative embodiment, the commands are transmitted one by one to the second terminal apparatus 5B. However, in the second illustrative embodiment, some commands are collectively transmitted within a range that can be received by the second terminal apparatus 5B. Therefore, even when the inquiry apparatus is the second terminal apparatus 5B, it is possible to reduce the number of transmission times of the instruction to the second terminal apparatus 5B more than the first illustrative embodiment.

Also, in the second illustrative embodiment, the commands are accumulated in the list as long as a command that requires restart is not included, and when one command that involves restart is included in the list, the commands in the list at that point of time are transmitted to the second terminal apparatus 5B. According to this configuration, the command that involves restart is not transmitted more than once. For this reason, it is possible to suppress a situation where when a command that involves first restart is executed in the second terminal apparatus 5B and the second terminal apparatus 5B is thus restarted, a command that involves second restart is lost from the memory 512 due to the restart.

(3.3) Third Illustrative Embodiment

Figure 5:
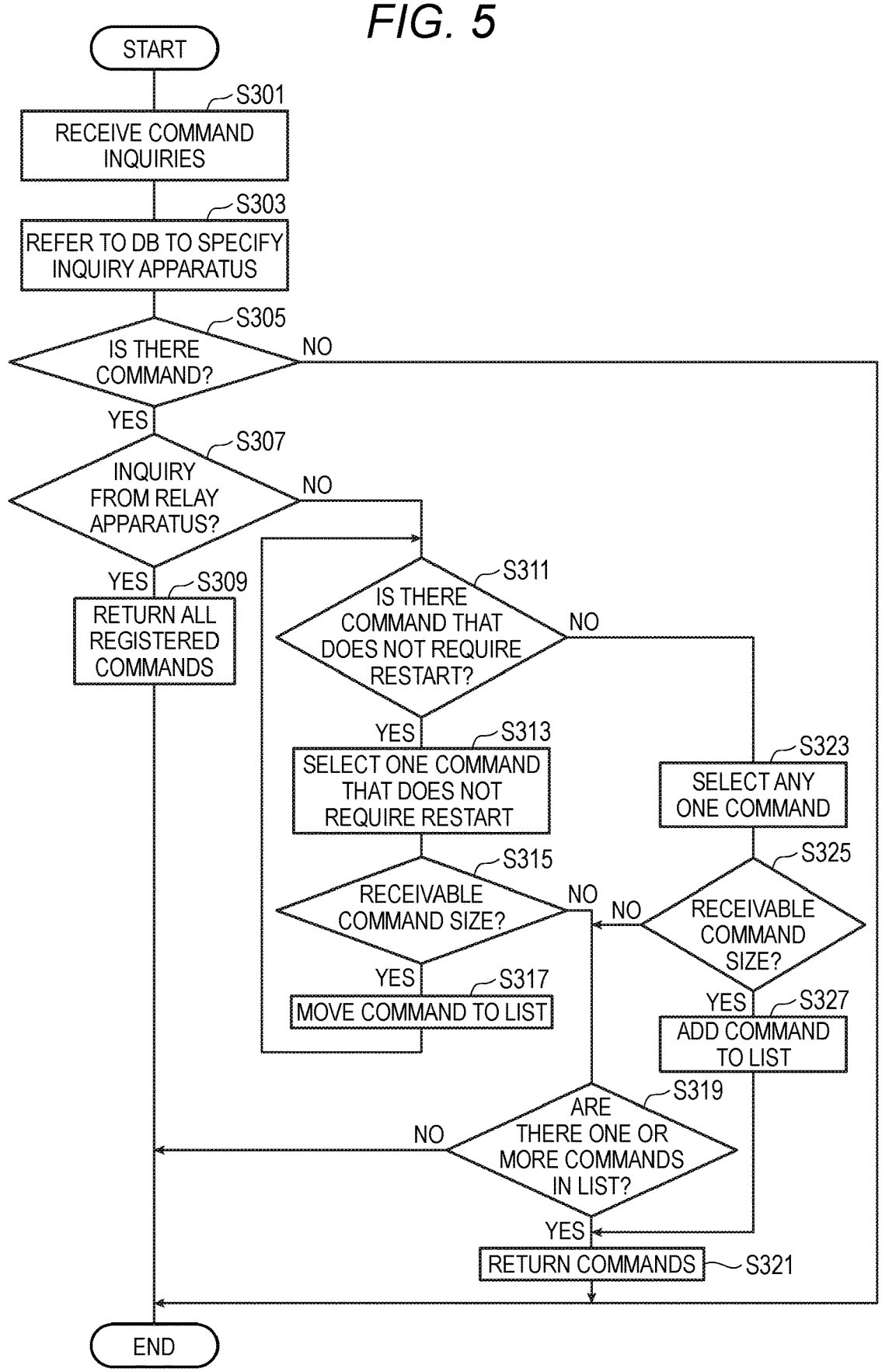
FIG. 5 is a flowchart depicting instruction transmission processing of a third illustrative embodiment.

In a third illustrative embodiment, the terminal management apparatus 3 is configured to execute instruction transmission processing shown in FIG. 5. In FIG. 5, each processing step from S301 to S309 is equivalent to each processing step from S101 to S109 described in the first illustrative embodiment. That is, when the instruction transmission processing shown in FIG. 5 starts, the terminal management apparatus 3 receives the command inquiries from the relay apparatus 4 and the second terminal apparatus 5B (S301). Subsequently, the terminal management apparatus 3 refers to the DB 351 to specify the inquiry apparatus (S303).

Subsequently, the terminal management apparatus 3 determines whether there is a command for the inquiry apparatus specified in S303 (S305). When it is determined in S305 that there is no command (S305: NO), the instruction transmission processing shown in FIG. 5 is over. On the other hand, when it is determined in S305 that there is a command (S305: YES), the terminal management apparatus 3 determines whether the inquiry is an inquiry from the relay apparatus 4 (S307).

When it is determined in S307 that the inquiry is an inquiry from the relay apparatus 4 (S307: YES), the terminal management apparatus 3 returns all of the commands registered on the DB 351 to the inquiry apparatus (i.e., the relay apparatus 4) (S309). When the processing of S309 is completed, the instruction transmission processing shown in FIG. 5 is over. On the other hand, when it is determined in S307 that the inquiry is not an inquiry from the relay apparatus 4 (S307: NO), the inquiry apparatus is the second terminal apparatus 5B. In this case, the terminal management apparatus 3 determines whether there is a command, which does not require restart, in the pooled commands (S311).

When it is determined in S311 that there is a command that does not require restart (S311: YES), the terminal management apparatus 3 selects one command that does not require restart (S313). Subsequently, the terminal management apparatus 3 determines whether the command has a receivable command size (S315). When it is determined in S315 that the command has a receivable command size (S315: YES), the terminal management apparatus 3 adds the command selected in S313 to the list (S317).

S315 and S317 are processing steps equivalent to S213 and S215 of the second illustrative embodiment. The determination based on the data amounts D1, D2 and D3 and the inequality D2≤D1−D3 is also performed in a similar manner to the second illustrative embodiment. When the processing of S317 is completed, the flow returns to S311. Thereby, the processing steps of S311 and thereafter are re-executed. When the processing steps from S311 to S317 are repeatedly executed, the command selected in S313 is added to the list in S317, so that the data amount D3 of the commands included in the list increases.

As a result, it may be determined in S315 that the command does not have a receivable command size (S315: NO). In this case, the terminal management apparatus 3 determines whether there are one or more commands in the list (S319). When it is determined in S319 that there are one or more commands in the list (S319: YES), the terminal management apparatus 3 returns the commands included in the list to the inquiry apparatus (i.e., the second terminal apparatus 5B) (S321).

That is, in the instruction transmission processing shown in FIG. 5, in a case where the data amount D3 of the commands accumulated in the list is likely to exceed the data amount D1 that can be received by the second terminal apparatus 5B, the commands accumulated in the list are transmitted to the second terminal apparatus 5B at a point of time just before that. When the processing of S321 is completed, the instruction transmission processing shown in FIG. 5 is over. On the other hand, when it is determined in S319 that there is no command in the list (S319: NO), the instruction transmission processing shown in FIG. 5 is over without executing the processing of S321.

In S311, it may be determined that there is no command that does not require restart (S311: NO). In this case, the terminal management apparatus 3 selects any one command (S323). The command selected in S323 is a command that requires restart because the flow proceeds to S323 via S311: NO). Subsequently, the terminal management apparatus 3 determines whether the command has a receivable command size (S325). When it is determined in S325 that the command has a receivable command size (S325: YES), the terminal management apparatus 3 adds the command selected in S323 to the list (S327).

S325 and S327 are processing steps equivalent to S213 and S215 of the second illustrative embodiment. The determination based on the data amounts D1, D2 and D3 and the inequality D2≤D1−D3 is also performed in a similar manner to the second illustrative embodiment. When the processing of S327 is completed, the terminal management apparatus 3 returns the commands included in the list to the inquiry apparatus (i.e., the second terminal apparatus 5B) (S321). When the processing of S321 is completed, the instruction transmission processing shown in FIG. 5 is over.

It may be determined in S325 that the command does not have a receivable command size (S325: NO). In this case, the terminal management apparatus 3 determines whether there are one or more commands in the list (S319). When it is determined in S319 that there are one or more commands in the list (S319: YES), the terminal management apparatus 3 returns the commands included in the list to the inquiry apparatus (i.e., the second terminal apparatus 5B) (S321).

When the processing of S321 is completed, the instruction transmission processing shown in FIG. 5 is over. On the other hand, when it is determined in S319 that there is no command in the list (S319: NO), the instruction transmission processing shown in FIG. 5 is over without executing the processing of S321.

Also in the third illustrative embodiment configured as described above, the similar operations and effects to the first illustrative embodiment are achieved, and it is possible to transmit the instructions of data amounts, which are suitable for each of the relay apparatus 4 having a relatively large memory capacity and the second terminal apparatus 5B having a relatively small memory capacity, to each of the relay apparatus 4 and the second terminal apparatus 5B. Also, in the first illustrative embodiment, the commands are transmitted one by one to the second terminal apparatus 5B. However, in the third illustrative embodiment, some commands are collectively transmitted within a range that can be received by the second terminal apparatus 5B. Therefore, even when the inquiry apparatus is the second terminal apparatus 5B, it is possible to reduce the number of transmission times of the instruction to the second terminal apparatus 5B more than the first illustrative embodiment, which is similar to the second illustrative embodiment.

Also, in the third illustrative embodiment, the commands are accumulated in the list as long as a command that requires restart is not included, and when one command that involves restart is included in the list, the commands in the list at that point of time are transmitted to the second terminal apparatus 5B. This is also similar to the second illustrative embodiment. According to this configuration, the command that involves restart is not transmitted more than once. For this reason, it is possible to suppress a situation where when a command that involves first restart is executed in the second terminal apparatus 5B and the second terminal apparatus 5B is thus restarted, a command that involves second restart is lost from the memory 512 due to the restart.

In the second illustrative embodiment, the command is selected from the pooled commands and it is then determined whether the selected command is a command that requires restart. However, in the third illustrative embodiment, it is determined whether there is a command that does not require restart and the command that does not require restart is then preferentially selected and accumulated in the list. For this reason, according to the third illustrative embodiment, even in a case where a command that requires restart and a command that does not require restart coexist if the registration order on the DB 351 is observed, it is possible to combine and add commands, which do not require restart, in the list. Therefore, according to the third illustrative embodiment, it is possible to reduce the number of divisions of the instruction and the number of transmission times, as compared to the second illustrative embodiment.

(4) Other Illustrative Embodiments

Although the terminal management processing program, the terminal management apparatus and the terminal management system have been described using the illustrative embodiments, the illustrative embodiments are just exemplified as one aspect of the present disclosure. That is, the present disclosure is not limited to the illustrative embodiments and can be implemented in diverse forms without departing from the technical spirit of the present disclosure.

For example, in the above illustrative embodiments, the mobile printer and the wireless LAN incompatible type printer or MFP have been exemplified as the terminal apparatus 5. However, the present disclosure is not limited to the configuration where the terminal apparatus 5 has the printer function or not. For example, the terminal apparatus 5 may also be a PC (Personal Computer), a smartphone and the like. Alternatively, the terminal apparatus 5 may also be an industrial device or commercial device (for example, an industrial sewing machine, a vending machine, a commercial washing machine, a medical device and the like) configured to be remotely operated or managed via the network. Alternatively, the terminal apparatus 5 may also be a household electronic product (for example, a refrigerator, a television, an air conditioner, a washing machine and the like) configured to be remotely operated or managed via the network.

In the above illustrative embodiments, the LAN 8 is configured by the combination of the wired LAN and the wireless LAN. However, the LAN 8 may also be configured by either the wired LAN or the wireless LAN.

In addition, for example, the plurality of functions that is implemented by one constitutional element exemplified in the illustrative embodiments may also be implemented by a plurality of constitutional elements. One function that is implemented by one constitutional element exemplified in the illustrative embodiments may also be implemented by a plurality of constitutional elements. The plurality of functions that is implemented by the plurality of constitutional elements exemplified in the illustrative embodiments may also be implemented by one constitutional element. One function that is implemented by the plurality of constitutional elements exemplified in the illustrative embodiments may also be implemented by one constitutional element. Some of the configurations exemplified in the illustrative embodiments may also be omitted.

(5) Supplements

As can be clearly seen from the above-described illustrative embodiments, the terminal management processing program, the terminal management apparatus and the terminal management system of the present disclosure may further have configurations that are enumerated in the below.

(A) In the second transmission processing, the number of divisions at the time when the instruction is divided may be changed according to the number of the received instruction (i.e., the command registered on the DB 351, as the action information).

When the processor provided for the terminal management apparatus is caused to execute processing based on the terminal management processing program configured in this manner, if the number of instructions is large, the number of divisions is changed to a number of divisions corresponding to the number of instructions, and if the number of instructions is small, the number of divisions is changed to a number of divisions corresponding to the number of instructions. Therefore, as compared a configuration where the number of divisions is set irrespective of the number of instructions, it is possible to suppress the number of transmission times from excessively increasing, within a range in which the data amount of each of the divided instructions is appropriate.

(B) In the second transmission processing, when two or more instructions are included in one transmission unit, an order of executing the two or more instructions may be changed according to a predetermined preference order (for example, a command that does not require restart is made to have a priority, as exemplified in the third illustrative embodiment).

When the processor provided for the terminal management apparatus is caused to execute processing based on the terminal management processing program configured in this manner, if an instruction having a low preference order and an instruction having a high preference order are included in a transmission unit after division, irrespective of the preference order, the preference order can be changed.

(C) In the second transmission processing, when the restart instruction for the second terminal apparatus is included in the received instruction, the received instruction may be divided in the transmission unit so that the restart instruction included in each transmission unit is to be one or less, and when one restart instruction and one or more instructions other than the restart instruction are included in one transmission unit, an order of executing each instruction may be changed so that one or more instructions other than the restart instruction are executed earlier than the restart instruction.

When the processor provided for the terminal management apparatus is caused to execute processing based on the terminal management processing program configured in this manner, one or more instructions other than the restart instruction are executed earlier than the restart instruction. For this reason, it is possible to suppress one or more instructions other than the restart instruction from being lost on the memory in association with the restart. Therefore, it is possible to appropriately execute the instructions other than the restart instruction.

(D) In the determination processing, when a transmission request of the received instruction is received from the transmission destination that is any one of the relay apparatus and the second terminal apparatus, it may be determined whether the transmission destination is the relay apparatus or the second terminal apparatus, based on information registered on the database provided in the terminal management apparatus.

(E) In the second transmission processing, when a transmission request of the received instruction is received from the second terminal apparatus, the instruction included in one transmission unit may be transmitted to the second terminal apparatus, and when a transmission request of the received instruction is again received from the second terminal apparatus after the transmission, the instruction included in one transmission unit different from the transmitted transmission unit may be transmitted to the second terminal apparatus.

When the processor provided for the terminal management apparatus is caused to execute processing based on the terminal management processing program configured in this manner, it is possible to repeat processing of transmitting an instruction at a timing at which it is ready for reception in the second terminal apparatus.

(F) In the second transmission processing, the number of instructions to be included in one transmission unit may be changed according to the memory capacity of the second terminal apparatus.

When the processor provided for the terminal management apparatus is caused to execute processing based on the terminal management processing program configured in this manner, the number of instructions to be included in one transmission unit can be increased if the memory capacity of the second terminal apparatus is large, and the number of instructions to be included in one transmission unit can be reduced if the memory capacity of the second terminal apparatus is small. Thereby, it is possible to favorably regulate the memory usage of the second terminal apparatus according to the memory capacity of the second terminal apparatus.

(G) The terminal management apparatus configured to execute processing based on the terminal management processing program and the terminal management system including the terminal management apparatus are also novel and useful. A terminal management method that is executed in the terminal management apparatus on the basis of the terminal management processing program, and a computer-readable non-transitory tangible recording medium having the terminal management processing program stored thereon are also novel and useful.

As discussed above, the disclosure may provide at least the following illustrative, non-limiting aspects.

In one aspect of the present disclosure, a terminal management processing program is for causing a processing unit provided in a terminal management apparatus to execute determination processing, first transmission processing and second transmission processing in a terminal management system where a first system and a second system coexist, wherein the first system includes the terminal management apparatus, a relay apparatus and a first terminal apparatus, the terminal management apparatus is configured to be able to communicate with the relay apparatus, the relay apparatus is configured to be able to communicate with the first terminal apparatus, and in a case transferring information between the terminal management apparatus and the first terminal apparatus, the information is transferred via the relay apparatus, and wherein the second system includes the terminal management apparatus and a second terminal apparatus, the terminal management apparatus is configured to be able to communicate with the second terminal apparatus, and in a case transferring information between the terminal management apparatus and the second terminal apparatus, the information is transferred without passing through the relay apparatus.

The determination processing is processing of, in a case transmitting an instruction received from an external apparatus to a transmission destination, determining whether the transmission destination is the relay apparatus or the second terminal apparatus. The first transmission processing is processing of, in a case it is determined in the determination processing that the transmission destination is the relay apparatus, transmitting the received instruction to the relay apparatus. The second transmission processing is processing of, in a case it is determined in the determination processing that the transmission destination is the second terminal apparatus, transmitting the received instruction to the second terminal apparatus. In the second transmission processing, the received instruction is divided into a plurality of transmission units, and an instruction included in each transmission unit is transmitted to the second terminal apparatus. In the first transmission processing, the received instruction is transmitted to the relay apparatus without being divided.

In a case the processing unit of the terminal management apparatus is caused to execute the processing based on the terminal management processing program, the terminal management apparatus transmits the received instruction to the relay apparatus without dividing the same if the received instruction is an instruction that is to be treated in the relay apparatus or the first terminal apparatus. On the other hand, if the received instruction is an instruction that is to be treated in the second terminal apparatus, the terminal management apparatus divides the received instruction into the plurality of transmission units and transmits an instruction included in each transmission unit to the second terminal apparatus.

What is claimed is:

1. A non-transitory computer-readable medium storing a terminal management processing program readable by a computer of a terminal management apparatus in a terminal management system where a first system and a second system coexist,
the first system comprising the terminal management apparatus, a relay apparatus and a first terminal apparatus, the terminal management apparatus being configured to communicate with the relay apparatus, the relay apparatus being configured to communicate with the first terminal apparatus, the first system being configured to, in a case transferring information between the terminal management apparatus and the first terminal apparatus, transfer the information via the relay apparatus,
the second system comprising the terminal management apparatus and a second terminal apparatus, the terminal management apparatus being configured to communicate with the second terminal apparatus, and the second system being configured to, in a case transferring information between the terminal management apparatus and the second terminal apparatus, transfer the information without passing through the relay apparatus,
the terminal management processing program, when executed by the computer, causes the terminal management apparatus to perform:
in a case transmitting an instruction received from an external apparatus to a transmission destination, determining whether the transmission destination is the relay apparatus or the second terminal apparatus;
in a case it is determined that the transmission destination is the relay apparatus, transmitting the received instruction to the relay apparatus; and
in a case it is determined that the transmission destination is the second terminal apparatus, transmitting the received instruction to the second terminal apparatus,
wherein in the transmitting of the received instruction to the second terminal apparatus, the terminal management processing program causes the terminal management apparatus to perform:
dividing the received instruction into a plurality of transmission units; and
transmitting an instruction included in each transmission unit to the second terminal apparatus, and
wherein in the transmitting of the received instruction to the first terminal apparatus, the terminal management processing program causes the terminal management apparatus to perform transmitting the received instruction to the relay apparatus without being divided.

2. The non-transitory computer-readable medium according to claim 1, wherein in the transmitting of the received instruction to the second terminal apparatus, the terminal management processing program causes the terminal management apparatus to perform changing the number of divisions at the time of dividing the instruction according to the number of the received instruction.

3. The non-transitory computer-readable medium according to claim 1, wherein in the transmitting of the received instruction to the second terminal apparatus, in a case two or more instructions are included in one transmission unit, the terminal management processing program causes the terminal management apparatus to perform changing an order of executing the two or more instructions according to a predetermined preference order.

4. The non-transitory computer-readable medium according to claim 3, wherein in the transmitting of the received instruction to the second terminal apparatus, the terminal management processing program causes the terminal management apparatus to perform:
in a case a restart instruction for the second terminal apparatus is included in the received instruction, dividing the received instruction in the transmission unit such that the restart instruction included in each transmission unit is to be one or less; and
in a case one restart instruction and one or more instructions other than the restart instruction are included in one transmission unit, changing an order of executing each instruction such that one or more instructions other than the restart instruction are to be executed earlier than the restart instruction.

5. The non-transitory computer-readable medium according to claim 1, wherein in the determining, in a case a transmission request of the received instruction is received from the transmission destination that is any one of the relay apparatus and the second terminal apparatus, the terminal management processing program causes the terminal management apparatus to perform determining whether the transmission destination is the relay apparatus or the second terminal apparatus based on information registered on a database provided in the terminal management apparatus.

6. The non-transitory computer-readable medium according to claim 1, wherein in the transmitting of the received instruction to the second terminal apparatus, the terminal management processing program causes the terminal management apparatus to perform:
in a case a transmission request of the received instruction is received from the second terminal apparatus, transmitting the instruction included in first transmission unit to the second terminal apparatus; and
in a case a transmission request of the received instruction is again received from the second terminal apparatus after the transmission, transmitting the instruction included in second transmission unit to the second terminal apparatus, the second transmission unit being different from the transmitted first transmission unit.

7. The non-transitory computer-readable medium according to claim 1, wherein in the transmitting of the received instruction to the second terminal apparatus, the terminal management processing program causes the terminal management apparatus to perform changing the number of instructions to be included in one transmission unit according to a memory capacity of the second terminal apparatus.

8. A terminal management apparatus of a terminal management system where a first system and a second system coexist,
the first system comprising the terminal management apparatus, a relay apparatus and a first terminal apparatus, the terminal management apparatus being configured to communicate with the relay apparatus, the relay apparatus being configured to communicate with the first terminal apparatus, the first system being configured to, in a case transferring information between the terminal management apparatus and the first terminal apparatus, transfer the information via the relay apparatus,
the second system comprising the terminal management apparatus and a second terminal apparatus, the terminal management apparatus being configured to communicate with the second terminal apparatus, the second system being configured to, in a case transferring information between the terminal management apparatus and the second terminal apparatus, transfer the information without passing through the relay apparatus, the terminal management apparatus comprising a controller configured to:
in a case transmitting an instruction received from an external apparatus to a transmission destination, determine whether the transmission destination is the relay apparatus or the second terminal apparatus;
in a case it is determined that the transmission destination is the relay apparatus, transmit the received instruction to the relay apparatus; and
in a case it is determined that the transmission destination is the second terminal apparatus, transmit the received instruction to the second terminal apparatus,
wherein in the transmitting of the received instruction to the second terminal apparatus, the controller is configured to:
divide the received instruction into a plurality of transmission units; and
transmit an instruction included in each transmission unit to the second terminal apparatus, and
wherein in the transmitting of the received instruction to the first terminal apparatus, the controller is configured to transmit the received instruction to the relay apparatus without being divided.

9. The terminal management apparatus according to claim 8, wherein in the transmitting of the received instruction to the second terminal apparatus, the controller is configured to change the number of divisions at the time of dividing the instruction according to the number of the received instruction.

10. The terminal management apparatus according to claim 8, wherein in the transmitting of the received instruction to the second terminal apparatus, in a case two or more instructions are included in one transmission unit, the controller is configured to change an order of executing the two or more instructions according to a predetermined preference order.

11. The terminal management apparatus according to claim 10, wherein in the transmitting of the received instruction to the second terminal apparatus, the controller is configured to:
in a case a restart instruction for the second terminal apparatus is included in the received instruction, divide the received instruction in the transmission unit such that the restart instruction included in each transmission unit is to be one or less; and
in a case one restart instruction and one or more instructions other than the restart instruction are included in one transmission unit, change an order of executing each instruction such that one or more instructions other than the restart instruction are to be executed earlier than the restart instruction.

12. The terminal management apparatus according to claim 8, wherein in the determining, in a case a transmission request of the received instruction is received from the transmission destination that is any one of the relay apparatus and the second terminal apparatus, the controller is configured to determine whether the transmission destination is the relay apparatus or the second terminal apparatus based on information registered on a database provided in the terminal management apparatus.

13. The terminal management apparatus according to claim 8, wherein in the transmitting of the received instruction to the second terminal apparatus, the controller is configured to:
in a case a transmission request of the received instruction is received from the second terminal apparatus, transmit the instruction included in first transmission unit to the second terminal apparatus; and
in a case a transmission request of the received instruction is again received from the second terminal apparatus after the transmission, transmit the instruction included in second transmission unit to the second terminal apparatus, the second transmission unit being different from the transmitted first transmission unit.

14. The terminal management apparatus according to claim 8, wherein in the transmitting of the received instruction to the second terminal apparatus, the controller is configured to change the number of instructions to be included in one transmission unit according to a memory capacity of the second terminal apparatus.

15. A terminal management system where a first system and a second system coexist,
the first system comprising a terminal management apparatus, a relay apparatus and a first terminal apparatus, the terminal management apparatus being configured to communicate with the relay apparatus, the relay apparatus being configured to communicate with the first terminal apparatus, the first system being configured to, in a case transferring information between the terminal management apparatus and the first terminal apparatus, transfer the information via the relay apparatus,
the second system comprising the terminal management apparatus and a second terminal apparatus, the terminal management apparatus is configured to communicate with the second terminal apparatus, the second system being configured to, in a case transferring information between the terminal management apparatus and the second terminal apparatus, transfer the information without passing through the relay apparatus,
the terminal management apparatus comprising a processor and memory storing instructions, the instructions, when executed by the processor, causing the terminal management apparatus to perform:
in a case transmitting an instruction received from an external apparatus to a transmission destination, determining whether the transmission destination is the relay apparatus or the second terminal apparatus;
in a case it is determined that the transmission destination is the relay apparatus, transmitting the received instruction to the relay apparatus; and
in a case it is determined in the determination processing that the transmission destination is the second terminal apparatus, transmitting the received instruction to the second terminal apparatus,
wherein in the transmitting of the received instruction to the second terminal apparatus, the instructions cause the terminal management apparatus to perform:
dividing the received instruction into a plurality of transmission units; and
transmitting an instruction included in each transmission unit to the second terminal apparatus, and
wherein in the transmitting of the received instruction to the first terminal apparatus, the instructions cause the terminal management apparatus to perform transmitting the received instruction to the relay apparatus without being divided.

* * * * *